(12) United States Patent
Jeon et al.

(10) Patent No.: US 11,591,475 B2
(45) Date of Patent: Feb. 28, 2023

(54) POLYCARBONATE RESIN COMPOSITION AND OPTICAL MOLDED PRODUCT INCLUDING THE SAME

(71) Applicant: LG CHEM, LTD., Seoul (KR)

(72) Inventors: Byoungkue Jeon, Daejeon (KR); Youngwook Son, Daejeon (KR); Daehyeon Hwang, Daejeon (KR); Mooho Hong, Daejeon (KR)

(73) Assignee: LG CHEM, LTD., Seoul (KR)

( * ) Notice: Subject to any disclaimer, the term of this patent is extended or adjusted under 35 U.S.C. 154(b) by 193 days.

(21) Appl. No.: 16/756,090

(22) PCT Filed: Apr. 18, 2019

(86) PCT No.: PCT/KR2019/004713
§ 371 (c)(1),
(2) Date: Apr. 14, 2020

(87) PCT Pub. No.: WO2019/221408
PCT Pub. Date: Nov. 21, 2019

(65) Prior Publication Data
US 2020/0239691 A1    Jul. 30, 2020

(30) Foreign Application Priority Data
May 15, 2018 (KR) .......... 10-2018-0055589

(51) Int. Cl.
| | |
|---|---|
| C08K 5/00 | (2006.01) |
| G02B 1/04 | (2006.01) |
| C09B 1/503 | (2006.01) |
| C08G 64/06 | (2006.01) |
| C08K 5/103 | (2006.01) |
| C08K 5/18 | (2006.01) |

(52) U.S. Cl.
CPC ........... *C09B 1/5035* (2013.01); *C08G 64/06* (2013.01); *C08K 5/0041* (2013.01); *C08K 5/103* (2013.01); *C08K 5/18* (2013.01); *G02B 1/041* (2013.01)

(58) Field of Classification Search
CPC ...... C09B 1/5035; C08G 64/06; G02B 1/041; C08K 5/0041; C08K 5/18; C08K 5/103
See application file for complete search history.

(56) References Cited

U.S. PATENT DOCUMENTS

| | | |
|---|---|---|
| 2004/0044119 A1 | 3/2004 | Etzrodt et al. |
| 2005/0215677 A1 | 9/2005 | Gaggar et al. |
| 2007/0087199 A1* | 4/2007 | Yoshimura ............... B32B 7/12 428/411.1 |
| 2007/0135544 A1 | 6/2007 | Seidel et al. |
| 2007/0299168 A1* | 12/2007 | Ariki ..................... C08K 5/3475 524/91 |
| 2008/0014376 A1 | 1/2008 | Horio et al. |
| 2009/0186967 A1 | 7/2009 | Akada et al. |
| 2012/0269994 A1 | 10/2012 | Sybert et al. |
| 2013/0035441 A1 | 2/2013 | de Brouwer et al. |
| 2013/0131257 A1* | 5/2013 | Sharma .................... C08L 69/00 525/391 |
| 2013/0225763 A1 | 8/2013 | Pai-Paranjape et al. |
| 2013/0253114 A1 | 9/2013 | Seidel et al. |
| 2013/0265771 A1 | 10/2013 | Flores et al. |
| 2014/0178635 A1* | 6/2014 | Imaizumi ................. B32B 7/027 428/192 |
| 2014/0226342 A1 | 8/2014 | Flores et al. |
| 2014/0370213 A1* | 12/2014 | van der Mee .......... C08L 83/04 524/126 |
| 2015/0267059 A1 | 9/2015 | Flores et al. |
| 2015/0299460 A1 | 10/2015 | Vollenberg et al. |
| 2016/0289377 A1 | 10/2016 | de Brouwer et al. |
| 2016/0319127 A1* | 11/2016 | Jeong .................... C08L 69/005 |
| 2017/0210882 A1 | 7/2017 | Sharifi |
| 2019/0300648 A1 | 10/2019 | Chun et al. |

FOREIGN PATENT DOCUMENTS

| | | | |
|---|---|---|---|
| CN | 1946806 A | 4/2007 | |
| CN | 104136489 | 11/2014 | |
| CN | 104220502 A | 12/2014 | |
| CN | 104540889 | 4/2015 | |
| CN | 107151434 | 9/2017 | |
| CN | 107266893 | 10/2017 | |
| CN | 107429055 A | 12/2017 | |
| EP | 2009057 A1 | 12/2008 | |
| JP | 2007-169503 | 7/2007 | |
| JP | 2007284540 | 11/2007 | |
| JP | 2009518474 | 5/2009 | |
| JP | 2014051551 | 3/2014 | |
| JP | 2014051551 A * | 3/2014 | ............... C08K 3/04 |
| KR | 10-20030060935 | 7/2003 | |
| KR | 10-20050010911 | 1/2005 | |
| KR | 10-20070018921 | 2/2007 | |
| KR | 20070018921 A * | 2/2007 | ........... C08K 5/0041 |
| KR | 10-20140146645 | 12/2014 | |
| KR | 10-20170036252 | 4/2017 | |
| KR | 10-20170037964 | 4/2017 | |
| KR | 10-1770452 | 9/2017 | |
| KR | 10-1816133 | 1/2018 | |
| WO | 2005-103159 | 11/2005 | |
| WO | 2013-137364 | 9/2013 | |
| WO | 2013-152292 | 10/2013 | |
| WO | WO-2013152292 A1 * | 10/2013 | ........... C08K 5/0066 |

OTHER PUBLICATIONS

Search Report of European Patent Office in Appl'n No. 19802975.3, dated Feb. 10, 2021.
Search Report of Taiwanese Patent Office in Appl'n No. 108115156, dated Apr. 21, 2020.
International Search Report and the Written Opinion of PCT/KR2019/004713, dated Aug. 1, 2019.
Office Action of Japanese Patent Office in Appl'n No. 2020-518505, dated Apr. 20, 2021.

* cited by examiner

*Primary Examiner* — Bijan Ahvazi
(74) *Attorney, Agent, or Firm* — Dentons US LLP

(57) ABSTRACT

Provided are a polycarbonate resin composition comprising a polycarbonate resin, pentaerythritol tetrastearate, a black dye, and a blue dye, and an optical molded product comprising same.

9 Claims, No Drawings

POLYCARBONATE RESIN COMPOSITION AND OPTICAL MOLDED PRODUCT INCLUDING THE SAME

CROSS-REFERENCE TO RELATED APPLICATIONS

This application is a National Stage Application of International Application No. PCT/KR2019/004713 filed on Apr. 18, 2019, which claims priority to Korean Patent Application No. 10-2018-0055589 filed with Korean Intellectual Property Office on May 15, 2018, the entire contents of which are incorporated herein by reference.

TECHNICAL FIELD

The present invention relates to a polycarbonate resin composition having excellent thermal stability and optical properties, and an optical molded product including the same.

BACKGROUND ART

Polycarbonate resins are excellent in physical properties such as impact strength, dimensional stability, heat resistance, and transparency, and thus are used in many applications such as for exterior materials of electronic and electrical products, automobile parts, building materials, optical parts, and the like.

Recently, as the field of application of these polycarbonates has expanded, there has been a need to develop novel polycarbonates having improved thermal stability and optical properties while maintaining the physical properties inherent to polycarbonates.

In particular, when applied to optical products, since it is important to maintain a desired level of optical properties (excellent shielding rate or transmittance) without deformation of the product even under high temperature conditions, the development of technologies for simultaneously improving thermal stability and optical properties is needed.

Accordinaly, attempts have been made to introduce monomers having different structures into the main chain of polycarbonates by copolymerizing aromatic diols having different structures, or to obtain desired physical properties by using additional additives.

However, most technologies have a high production cost, and have limitations, for example, when the chemical resistance, heat resistance, and the like are increased, conversely, the optical properties are deteriorated, and when the optical properties are improved, the chemical resistance, heat resistance, and the like are decreased.

In addition, it is necessary to adjust the transparency of the polycarbonates depending on the applicable product group. For example, when applied to an optical product (for example, a lens) or the like, it is necessary to reduce the transmittance in a specific wavelength range in accordance with the purpose of use.

Therefore, there is still a need for research and development of a novel polycarbonate having excellent heat resistance while satisfying desired optical properties (excellent shielding rate or transmittance) depending on the products to which polycarbonate is applied.

DETAILED DESCRIPTION OF THE INVENTION

Technical Problem

An object of the present invention is to provide a polycarbonate resin composition having excellent heat resistance and excellent optical properties by introducing a specific additive and a combination of two kinds of dyes.

Another object of the present invention is to provide an optical molded product produced from the above-mentioned polycarbonate resin composition.

Technical Solution

In one aspect of the invention, a polycarbonate resin composition including: a polycarbonate resin having a melt flow rate (MFR) of 5 to 15 g/10 min according to ASTM D1238; pentaerythritol tetrastearate; a black dye; and a blue dye, wherein transmittance at 410 nm according to ASTM D1003 is 7% or less, and wherein a change in yellowness index expressed by General Equation 1 described later is 0.5 or less, is provided.

In another aspect of the invention, an optical molded product including the above-mentioned polycarbonate resin composition is provided.

Hereinafter, a copolycarbonate, a process for producing the same, and a molded product including the same according to specific embodiments of the invention will be described in more detail.

Unless explicitly specified otherwise in this specification, the terms are only for describing specific embodiments and are not intended to limit the present invention.

As used herein, the singular forms "a", "an", and "the" are intended to include the plural forms as well, unless the context clearly indicates otherwise.

The terms "comprises", "comprising", "includes", and/or "including", when used herein, specify the presence of stated features, regions, integers, steps, operations, elements, and/or components, but do not preclude the presence or addition of other features, regions, integers, steps, operations, elements, components, and/or groups thereof.

Terms including ordinal numbers such as "first", "second", etc. are used only for the purpose of distinguishing one component from another component, and are not limited by the ordinal numbers.

For instance, a first component can be referred to as a second component, or similarly, the second component can be referred to as the first component, without departing from the scope of the present invention.

In the case of a polycarbonate resin, it is necessary to adjust the transparency of a polycarbonate according to the applied product group. For example, when applied to an optical product (for example, a lens) or the like, it is necessary to reduce the transmittance in a specific wavelength range in accordance with the purpose of use.

However, when an additive is used for the purpose of simply increasing the shielding rate, there is a problem that the heat resistance is remarkably lowered under high temperature conditions, and deformation or discoloration of the polymer occurs during the production process.

In this regard, the present inventors have realized low transmittance in a specific wavelength range and a low change in yellowness index under high temperature conditions by using a specific additive and two types of dyes having excellent absorption rates at a predetermined wavelength in combination, and thus have developed a polycarbonate resin composition having excellent heat resistance and a high shielding rate in a specific wavelength range.

When a product is produced using the above-mentioned polycarbonate resin composition of the present invention, the degree of denaturation and hue change of the polymer is remarkably small even during high temperature injection molding conditions in the production process.

In addition, even if the product is actually used and subjected to high temperature environments, it can exhibit excellent physical properties without deformation.

In particular, when used as a lens, it can exhibit an excellent shielding rate in a specific visible light region (410 nm), and thus can be used for a wide range of applications such as general use, industrial use, sports use, special use, and the like, which is preferable.

The polycarbonate resin composition according to one embodiment of the present invention satisfies a transmittance at 410 nm of 7% or less according to ASTM D1003.

By simultaneously satisfying both the transmittance in the above range and the change in yellowness index described later, it is possible to satisfy all the above-mentioned physical properties when applied to a product.

When the transmittance at 410 nm is more than 7%, there is a problem that it is not possible to apply to various optical molded products such as general use, industrial use, sports use, and special use.

Further, the transmittance at 410 nm can preferably satisfy 5% or less, and more preferably 4.5% or less. In this case, effects intended by the present invention can be increased.

The polycarbonate resin composition according to one embodiment of the invention satisfies a change in yellowness index (ΔYI) according to the following General Equation 1 of 0.5 or less, and by simultaneously satisfying the change in yellowness index (ΔYI) and the transmittance in the above range, it is possible to satisfy all the physical properties when applied to products.

$$\Delta YI = YI(340° C.) - YI(285° C.)$$ [General Equation 1]

Herein, YI is the yellowness index value measured according to ASTM D1925 at the corresponding temperature.

When a product is produced using the polycarbonate resin composition, the parameter of change in yellowness index (ΔYI) in the above range means an index showing excellent heat resistance even in a high temperature injection process. This means that even when there is a temperature change at high temperatures from 285° C. to 340° C., it shows a remarkably low change in yellowness index, and thus exhibits excellent heat resistance not only in the product manufacturing process but also even if the product is used while subjected to high temperature environmental conditions.

When the change in yellowness index is more than 0.5, the heat resistance is lowered and the transmittance is lowered, which is not suitable for use as a lens.

Further, the change in yellowness index can preferably satisfy 0.3 or less, and more preferably 0.1 or less. In this case, effects intended by the present invention can be increased.

A polycarbonate resin composition according to one embodiment of the present invention includes: a polycarbonate resin; pentaerythritol tetrastearate; a black dye; and a blue dye, thereby satisfying the above-mentioned specific parameter values.

In the following, specific properties of each component will be described in more detail.

Polycarbonate Resin

As used herein, the term "polycarbonate" refers to a polymer that is prepared by reacting a diphenol-based compound, a phosgene, a carbonate ester, or a combination thereof.

A polycarbonate is excellent in heat resistance, impact resistance, mechanical strength, transparency, and the like, and thus is widely used in the preparation of a compact disk, a transparent sheet, a packaging material, an automobile bumper, a UV-blocking film, an optical lens, and the like.

Examples of the diphenol-based compound can include hydroquinone, resorcinol, 4,4'-dihydroxydiphenyl, 2,2-bis(4-hydroxyphenyl)propane (also referred to as "bisphenol-A"), 2,4-bis(4-hydroxyphenyl)-2-methylbutane, bis(4-hydroxyphenyl)methane, 1,1-bis(4-hydroxyphenyl)cyclohexane, 2,2-bis(3-chloro-4-hydroxyphenyl)propane, 2,2-bis(3,5-dimethyl-4-hydroxyphenyl)propane, 2,2-bis(3,5-dichloro-4-hydroxyphenyl)propane, 2,2-bis(3,5-dibromo-4-hydroxyphenyl)propane, bis(4-hydroxyphenyl)sulfoxide, bis(4-hydroxyphenyl)ketone, bis(4-hydroxyphenyl)ether, and the like.

Preferably, 4,4'-dihydroxydiphenyl or 2,2-bis(4-hydroxyphenyl)propane can be used. In this case, the structure of the polycarbonate resin is of the following Chemical Formula 1:

[Chemical Formula 1]

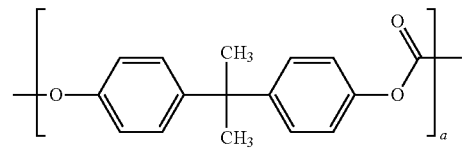

wherein in Chemical Formula 1, a is an integer of 1 or more.

The polycarbonate resin can be a mixture of copolymers prepared from two or more diphenols.

Also, the polycarbonate can include a linear polycarbonate, a branched polycarbonate, a polyester carbonate copolymer resin, and the like.

The linear polycarbonate can include a polycarbonate or the like which is prepared from bisphenol-A.

The branched polycarbonate can include those prepared by reacting a polyfunctional aromatic compound such as trimellitic anhydride and trimellitic acid with diphenols and carbonates.

The polyfunctional aromatic compound can be included in an amount from 0.05 to 2 mol %, based on the total amount of the branched polycarbonate.

The polyester carbonate copolymer resins can include those prepared by reacting a difunctional carboxylic acid with diphenols and carbonates.

The carbonates can include diaryl carbonates such as diphenyl carbonate and ethylene carbonate or the like.

The polycarbonate resin according to one embodiment of the invention satisfies a melt flow rate (MFR) of 5 to 15 g/10 min according to ASTM D1238.

When a polycarbonate resin having a melt flow rate in the above range is used, excellent physical properties can be realized at the time of application of the product by using it in combination with other components.

The melt flow rate is measured at 300° C. under a load of 1.2 kg according to ASTM D1238.

When the melt flow rate is less than 5 g/min, the processability can be decreased and the productivity can be reduced. When the melt flow rate is greater than 15 g/min, the resin flow can be excessive under the relevant processing conditions, which can cause surface defects in the molded product.

Further, the melt flow rate can preferably satisfy 6 to 13 g/10 min, and more preferably 7 to 10 g/10 min. In this case, effects intended by the present invention can be increased.

Preferably, the polycarbonate resin has a weight average molecular weight of 10,000 g/mol to 50,000 g/mol, and preferably 25,000 g/mol to 35,000 g/mol.

Within the above range, the moldability and processability are excellent.

Pentaerythritol Tetrastearate (PETS)

The pentaerythritol tetrastearate component according to one embodiment of the invention is a component having an auxiliary function to achieve excellent thermal stability and simultaneously improve shielding properties in a specific wavelength range, and it can be used in combination with a black dye and a blue dye to be described later to maximize its effects.

The pentaerythritol tetrastearate can be contained in an amount from 0.05 to 5 parts by weight, preferably 0.1 to 1 part by weight, based on 100 parts by weight of the polycarbonate resin.

When the pentaerythritol tetrastearate is contained within the above range, it is possible to achieve excellent heat resistance and shielding properties, and it is preferable for realizing heat resistance and auxiliary shielding effects in a specific wavelength range.

On the other hand, when the content is less than 0.05 parts by weight, it is difficult to realize a desired effect with a small amount, and when the content is greater than 5 parts by weight, the mechanical strength can be lowered.

Dye

In an embodiment of the invention, a black dye and a blue dye are used in combination, which are further used in combination with a component for improving the shielding property in a specific wavelength region, i.e., the above-mentioned PETS component, thereby simultaneously realizing shielding performance and heat resistance improving effects.

The black dye can be specifically a compound of C.I. Pigment Black 32 (perylene black), and commercially available products can be BK32 (THERMOPLAST Black X70) from BASF.

The black dye can effectively block light in the entire wavelength range, and when using it in combination with the PETS component and the blue dye, it is possible to achieve a shielding property that is suitable for application to lenses, which is preferable.

The black dye can be contained in an amount from $1.0 \times 10^{-4}$ to $1.0 \times 10^{-1}$ parts by weight, preferably $1.0 \times 10^{-4}$ to $1.0 \times 10^{-2}$ parts by weight, and more preferably $1.1 \times 10^{-3}$ to $2.0 \times 10^{-3}$ parts by weight, based on 100 parts by weight of the polycarbonate resin.

When the black dye is contained within the above range, the shielding properties suitable for application to a lens can be realized.

On the other hand, when the content is less than $1.0 \times 10^{-4}$ parts by weight, it is difficult to realize a desired effect with a small amount. When the content is greater than $1.0 \times 10^{-1}$ parts by weight, permeability can be reduced due to an excessive amount.

Specifically, the blue dye can be a compound of the following Chemical Formula 2 (CAS No. 81-48-1), and commercially available products can be Blue G (Macrolex Violet B Gran) from Lanxess:

[Chemical Formula 2]

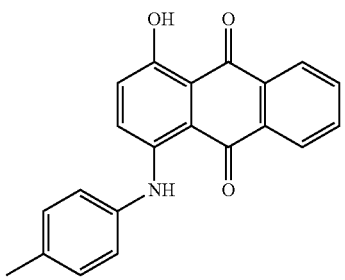

The blue dye can preferably be a reddish blue series dye.

The blue dye plays a role in improving the degree of yellowing of the resin, and at the same time, when used in combination with the PETS component and the black dye, it is possible to realize heat resistance and a shielding property suitable for application to a lens, which is preferable.

Furthermore, when used in further combination with a light absorber or the like, visible light in the range of 425 to 450 nm can be effectively controlled.

The blue dye can be contained in an amount from $1.0 \times 10^{-4}$ to $1.0 \times 10^{-1}$ parts by weight, preferably $1.0 \times 10^{-4}$ to $1.0 \times 10^{-2}$ parts by weight, more preferably $1.5 \times 10^{-3}$ to $2.5 \times 10^{-3}$ parts by weight, based on 100 parts by weight of the polycarbonate resin.

When the blue dye is contained within the above range, excellent shielding properties can be realized, and the degree of yellowing of the resin can be improved, which is preferable.

On the other hand, when the content is less than $1.0 \times 10^{-4}$ parts by weight, it is difficult to realize a desired effect with such a small amount. When the content is greater than $1.0 \times 10^{-1}$ parts by weight, it can be disadvantageous for commercial application due to the phenomenon in which the YI is decreased and the transmittance is reduced.

The polycarbonate resin composition according to one embodiment of the present invention includes the above-mentioned components and satisfies specific parameters (transmittance and ΔYI), thereby realizing heat resistance and excellent optical properties (shielding property at 410 nm). As a result, the degree of denaturation and hue change of the polymer is remarkably small even under high-temperature injection molding conditions in the manufacturing process.

Further, even if the product is actually used while subjected to high temperature environments, it can exhibit excellent physical properties without deformation.

In addition, if necessary, the resin composition can further include at least one additive selected from the group consisting of an antioxidant, a heat stabilizer, a plasticizer, an antistatic agent, a nucleating agent, a flame retardant, a lubricant, an impact-reinforcing agent, a fluorescent brightener, an ultraviolet absorber, and a radiation absorber.7

Optical Molded Product

In another embodiment of the invention, an optical molded product including the above-mentioned resin composition is provided.

Preferably, the optical molded product is a lens, and is suitable for use in an illumination lens or a spectacle lens.

The polycarbonate resin composition according to the present invention is excellent in heat resistance and shielding properties, and thus can be effectively used as an optical molded product.

The method for preparing a molded product can be carried out by methods commonly used in the art.

For example, the molded product can be preferably prepared by mixing the above-mentioned polycarbonate resin, pentaerythritol tetrastearate, a black dye, and a blue dye, and optionally, an additive, melt-kneading the mixture to prepare pellets, and then subjecting the pellets to injection molding in a desired form.

The melt kneading can be carried out by a method commonly used in the art, for example, a method using a ribbon blender, a Henschel mixer, a Banbury mixer, a drum tumbler, a single screw extruder, a twin screw extruder, a co-kneader, a multi-screw extruder, and the like.

The temperature of the melt-kneading can be suitably adjusted as needed.

Next, the molded product can be produced by applying a molding process such as an injection molding process, an injection compression molding process, an extrusion molding process, a vacuum molding process, a blow molding process, a press molding process, an air-pressure molding process, a foam molding process, a thermal bending molding process, a compression molding process, a calendar molding process, a rotary molding process, or the like, using the melt-kneaded product or pellets of the resin composition according to the present invention as a raw material.

When the injection molding method is used, it is subjected to high temperature conditions from 200 to 400° C. However, since the resin composition according to the present invention is excellent in heat resistance, modification or yellowing of the polymer does not substantially occur in the melt-kneading step or the injection step described above, which is preferable.

The thickness of the molded product can be appropriately adjusted in accordance with the purpose of use, and the shape of the light guide plate can be a flat plate or a curved shape in accordance with the purpose of use.

Advantageous Effects

According to the present invention, it is possible to provide a polycarbonate resin composition having excellent heat resistance and excellent optical properties by introducing a specific additive and two kinds of dyes.

Further, according to the present invention, it is possible to provide an optical molded product produced from a polycarbonate resin composition capable of exhibiting excellent optical properties even under high temperature conditions.

DETAILED DESCRIPTION OF THE EMBODIMENTS

Hereinafter, preferred examples are presented to facilitate understanding of the present invention.

However, the following examples are given for illustrative purposes only, and the scope of the present invention is not intended to be limited to or by these examples.

EXAMPLES AND COMPARATIVE EXAMPLES

Preparation of Polycarbonate Resin Composition

Examples 1 and 2, Comparative Examples 1 to 8

A polycarbonate resin composition was prepared by mixing the respective additive components in the amounts shown in Table 1 based on 100 parts by weight of the polycarbonate resin composition.

TABLE 1

| Classification (component/content) | PC resin | Additive | | | | Dye | |
|---|---|---|---|---|---|---|---|
| Parts by weight | A | B | C | D | E | F | G |
| Example 1 | a-1/ 99.404957 | b-1/ 0.075 | c-1/0.12 c-2/0.12 | d-1/ 0.05 | e-1/ 0.35 | f-1/0.00014 f-2/0.0002 | — |
| Example 2 | a-1/ 99.404957 | b-1/ 0.075 | c-1/0.12 | d-1/ 0.05 | e-1/ 0.35 | f-1/0.00017 f-2/0.0002 | — |
| Comparative Example 1 | a-1/ 99.404957 | b-1/ 0.075 | c-1/0.12 | d-1/ 0.05 | e-1/ 0.35 | — | g-1/0.00014 g-2/0.0002 |
| Comparative Example 2 | a-1/ 99.404957 | b-1/ 0.075 | c-1/0.12 | d-1/ 0.05 | e-1/ 0.35 | — | g-2/0.0002 |
| Comparative Example 3 | a-1/ 99.404957 | b-1/ 0.075 | c-1/0.12 | d-1/ 0.05 | e-1/ 0.35 | — | g-3/0.0002 |
| Comparative Example 4 | a-1/ 99.404957 | b-1/ 0.075 | c-1/0.12 | d-1/ 0.05 | e-1/ 0.35 | — | g-1/0.00014 g-3/0.0002 |
| Comparative Example 5 | a-1/ 99.404957 | b-1/ 0.075 | c-1/0.12 | d-1/ 0.05 | e-2/ 0.35 | f-1/0.00014 f-2/0.0002 | — |
| Comparative Example 6 | a-1/ 99.404957 | b-1/ 0.075 | c-1/0.12 | d-1/ 0.05 | e-3/ 0.35 | f-1/0.00017 f-2/0.0002 | — |

A (PC resin): a-1: Bisphenol A type of linear polycarbonate of Mw 32,000 and MFR (300° C., 1.2 kg) of 8 g/10 min (LG Chem)
B (antioxidant): b-1 PEP36 (ADEKA)
C (light absorber): c-1: UV3638 (Solvay), c-2: B-Cap (Clariant)
D (chain extender): d-1: ADR4370F (4468) (BASF)
E (additive): e-1: Pentaerythritol tetrastearate/e-2: GMS(glycerol mono stearate)/e-3: GTS (glycerol tri stearate)
F (dye): f-1 (Blue, Reddish Blue): Blue G/f-2(black) (Lanxess): BK32 (BASF)
G (dye): g-1 (Blue): BL12 (CAS No. 61969-44-6) (Lanxess), g-2 (red): RP04 (CAS No. 6829-22-7) (Lanxess), g-3 (Greenish Blue): Violet 3R (Lanxess)

Experimental Example

Pellet samples were prepared by melt-kneading the resin compositions prepared in the examples and comparative examples at a rate of 55 kg per hour in a twin screw extruder (L/D=36, Φ=45, barrel temperature 240° C.), and the properties of the prepared samples were measured by the following methods.

(1) Melt Flow Rate (MFR, g/min)

The melt flow rate was measured at 300° C. under a load of 1.2 kg using a Melt Indexer G-02 (manufactured by Toyoseiki) in accordance with ASTM D1238, and the results are shown in Table 2 below.

(2) Transmittance (%)

The transmittance at 410 nm was measured under the transmission condition of 350 to 1050 nm using a HUNTERLAB instrument in accordance with ASTM D1003, and the results are shown in Table 2 below.

(3) Change in Yellowness Index (ΔYI)

The yellowness index was measured under the transmission condition of 350 to 1050 nm using HUNTERLAB equipment in accordance with ASTM D1925.

The yellowness index was measured at 285° C. and 340° C. while heating from 285° C. to 340° C. for 20 minutes, and change in yellowness index was calculated according to the following General Equation 1. The results are shown in Table 2 below.

$$\Delta YI = YI(340° C.) - YI(285° C.) \qquad \text{[General Equation 1]}$$

TABLE 2

| Classification | Transmittance at 410 nm (%) | ΔYI |
| --- | --- | --- |
| Example 1 | 4.4 | 0.23 |
| Example 2 | 4.6 | 0.25 |
| Comparative Example 1 | 8.7 | 0.25 |
| Comparative Example 2 | 7.8 | 0.26 |
| Comparative Example 3 | 8.4 | 0.25 |
| Comparative Example 4 | 7.2 | 0.26 |
| Comparative Example 5 | 4.5 | 2.46 |
| Comparative Example 6 | 5.2 | 2.67 |

As shown in Table 2, it was confirmed that in the case of the examples according to the present invention, heat resistance and excellent optical properties can be simultaneously realized by introducing a specific additive and two kinds of dyes.

It was also confirmed that in the case of the comparative examples deviating from the combination of components of the present invention, the heat resistance is decreased under high temperature conditions and change in yellowness index is remarkably increased or the transmittance at 410 nm is increased, which is unsuitable for optical molded products, particularly lenses.

The invention claimed is:

1. A polycarbonate resin composition, comprising:
a polycarbonate resin having a melt flow rate (MFR) of 5 to 15 g/10 min at 300° C. under a load of 1.2 kg according to ASTM D1238, and that includes a repeating unit of Chemical Formula 1:

[Chemical Formula 1]

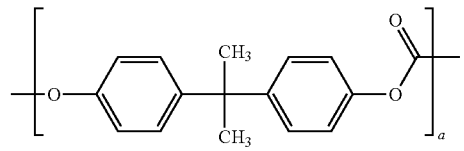

wherein in Chemical Formula 1, a is an integer of 1 or more, and
the polycarbonate resin has a weight average molecular weight of 32,000 g/mol to 50,000 g/mol;
pentaerythritol tetrastearate;
a black dye, wherein a total amount of black dye present is an amount from $1.0 \times 10^{-4}$ to $2.0 \times 10^{-3}$ parts by weight, based on 100 parts by weight of the polycarbonate resin, and wherein the black dye is C.I. Pigment Black 32; and
a blue dye,
wherein:
transmittance at 410 nm according to ASTM D1003 is 7% or less, and
change in yellowness index (ΔYI) expressed by the following General Equation 1 is 0.5 or less:

$$\Delta YI = YI(340° C.) - YI(285° C.) \qquad \text{[General Equation 1]}$$

wherein YI is the yellowness index value measured according to ASTM D1925 at the corresponding temperature.

2. The polycarbonate resin composition according to claim 1, wherein the blue dye is a compound of the following Chemical Formula 2:

[Chemical Formula 2]

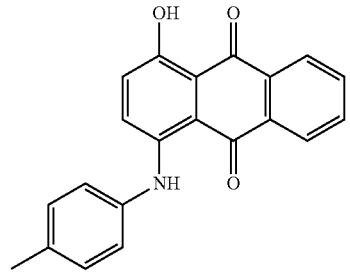

3. The polycarbonate resin composition according to claim 1, wherein the pentaerythritol tetrastearate is present in an amount from 0.05 to 5 parts by weight, and the blue dye is present in an amount of amount from $1.0 \times 10^{-4}$ to $1.0 \times 10^{-1}$ parts by weight, based on 100 parts by weight of the polycarbonate resin.

4. The polycarbonate resin composition according to claim 1, wherein the polycarbonate resin composition further comprises at least one additive selected from the group consisting of an antioxidant, a heat stabilizer, a plasticizer, an antistatic agent, a nucleating agent, a flame retardant, a lubricant, an impact-reinforcing agent, an ultraviolet absorber, and a fluorescent brightener.

5. An optical molded product comprising the polycarbonate resin composition according to claim 1.

6. The optical molded product according to claim 5, wherein the optical molded product is a lens.

7. The optical molded product according to claim 5, wherein the optical molded product is a spectacle lens.

8. The polycarbonate resin composition according to claim 1, wherein the blue dye is a compound of Chemical Formula 2:

[Chemical Formula 2]

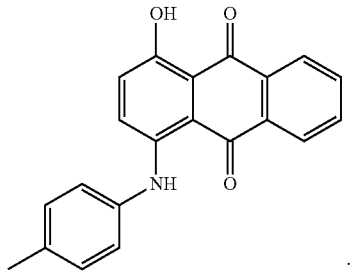

9. The polycarbonate resin composition according to claim 1, wherein the blue dye is present in an amount from $1.0 \times 10^{-4}$ to $2.5 \times 10^{-3}$ parts by weight, based on 100 parts by weight of the polycarbonate resin.

* * * * *

UNITED STATES PATENT AND TRADEMARK OFFICE
CERTIFICATE OF CORRECTION

PATENT NO. : 11,591,475 B2
APPLICATION NO. : 16/756090
DATED : February 28, 2023
INVENTOR(S) : Byoungkue Jeon et al.

It is certified that error appears in the above-identified patent and that said Letters Patent is hereby corrected as shown below:

In the Claims

Replace Claim 3 at Column 10 with the following:
—3. The polycarbonate resin composition according to claim 1, wherein the pentaerythritol tetrastearate is present in an amount from 0.05 to 5 parts by weight, and the blue dye is present in an amount from $1.0 \times 10^{-4}$ to $1.0 \times 10^{-1}$ parts by weight, based on 100 parts by weight of the polycarbonate resin.—

Signed and Sealed this
Eleventh Day of April, 2023

Katherine Kelly Vidal
*Director of the United States Patent and Trademark Office*